US012263945B2

(12) United States Patent
Nicodemos

(10) Patent No.: US 12,263,945 B2
(45) Date of Patent: Apr. 1, 2025

(54) MULTI-PURPOSE ON-BOARD SYSTEM FOR INDEPENDENTLY RELEASING BIOLOGICAL AGENTS FOR PRECISION BIOLOGICAL PEST CONTROL

(71) Applicant: NCB SISTEMAS EMBARCADOS EIRELI—EPP, São José dos Campos (BR)

(72) Inventor: Fernando Garcia Nicodemos, São Paulo (BR)

(73) Assignee: NCB SISTEMAS EMBARCADOS EIRELI—EPP, São José Dos Campos (BR)

( * ) Notice: Subject to any disclaimer, the term of this patent is extended or adjusted under 35 U.S.C. 154(b) by 541 days.

(21) Appl. No.: 17/433,876

(22) PCT Filed: Feb. 21, 2020

(86) PCT No.: PCT/BR2020/050054
§ 371 (c)(1),
(2) Date: Jan. 31, 2022

(87) PCT Pub. No.: WO2020/172731
PCT Pub. Date: Sep. 3, 2020

(65) Prior Publication Data

US 2022/0153416 A1 May 19, 2022

(30) Foreign Application Priority Data

Feb. 25, 2019 (BR) ...................... 10 2019 003863 2

(51) Int. Cl.
*B64D 1/16* (2006.01)
*G05D 1/00* (2006.01)
(Continued)

(52) U.S. Cl.
CPC ............. *B64D 1/16* (2013.01); *G05D 1/0016* (2013.01); *G05D 1/0038* (2013.01); *A01M 99/00* (2013.01); *B64U 2101/45* (2023.01)

(58) Field of Classification Search
None
See application file for complete search history.

(56) References Cited

U.S. PATENT DOCUMENTS 3,404,592 A * 10/1968 Lane .................... D01D 10/049
19/65 R
6,070,539 A * 6/2000 Flamme ............. A01M 7/0089
701/50
(Continued)

FOREIGN PATENT DOCUMENTS

BR 102014011793 A2 12/2015
CN 104176254 A 12/2014
(Continued)

OTHER PUBLICATIONS

Integrating GPS-enabled spray equipment into mosquito control, Proceedings of the 6th International Conference on Precision Agriculture and Other Precision Resources Management, Minneapolis, MN, USA, Jul. 14-17, 2002 (Year: 2002).*
(Continued)

*Primary Examiner* — Redhwan K Mawari
*Assistant Examiner* — Kai Wang
(74) *Attorney, Agent, or Firm* — CANTOR COLBURN LLP

(57) ABSTRACT

A multi-purpose on-board system for automating the process of releasing different biological precision pest control materials using, but not limited to, unmanned aerial vehicles (or drones). The system includes multi-purpose high-performance electronic equipment (hardware), a dedicated or shared GPS/GLONASS/GALILEO in the aircraft and four different dedicated electromechanical release assemblies,
(Continued)

specifically: a loose parasitic egg release assembly (Bio-BOT), a loose mass release assembly (BioCOTe), a live material (mite) release assembly (BioMITe), and a powdered beneficial fungus release assembly (BioFUNgus). The system enables full compliance throughout the biological control chain, including production, monitoring, integrated digital planning, controlled precision release and generation of reliable reports.

7 Claims, 9 Drawing Sheets

(51) Int. Cl.
*A01M 99/00* (2006.01)
*B64U 101/45* (2023.01)

(56) References Cited

U.S. PATENT DOCUMENTS

| | | | | | |
|---|---|---|---|---|---|
| 6,221,375 | B1* | 4/2001 | Howse | A01N 25/26 424/490 |
| 10,772,253 | B2* | 9/2020 | Calleija | A01B 79/005 |
| 11,574,465 | B2* | 2/2023 | Chen | G06V 20/13 |
| 2014/0303814 | A1* | 10/2014 | Burema | A01C 21/005 901/1 |
| 2015/0129675 | A1* | 5/2015 | Serenelli | A01G 25/02 239/10 |
| 2017/0231213 | A1* | 8/2017 | Gordon | G05D 1/0094 43/132.1 |
| 2018/0000575 | A1* | 1/2018 | Fobi | A01K 11/006 |
| 2018/0315100 | A1* | 11/2018 | Magnusson | G06Q 30/0283 |
| 2018/0359909 | A1* | 12/2018 | Conrad | A01M 7/005 |
| 2019/0037828 | A1* | 2/2019 | Bennett | A01B 79/02 |
| 2019/0162841 | A1* | 5/2019 | Peckham | G01S 5/0027 |

FOREIGN PATENT DOCUMENTS

| | | | | |
|---|---|---|---|---|
| CN | 105035325 A * | 11/2015 | |
| CN | 105613483 A | 6/2016 | |
| CN | 205284770 U * | 6/2016 | |
| CN | 106114863 A | 11/2016 | |
| CN | 206107581 U * | 4/2017 | |
| EP | 2737798 A2 * | 6/2014 | A01K 67/033 |
| WO | 2017106903 A1 | 6/2017 | |
| WO | WO-2019048907 A1 * | 3/2019 | A01G 7/06 |

OTHER PUBLICATIONS

International Search Report issued Jul. 14, 2020 re: Application No. PCT/BR2020/050054, pp. 1-3, citing: US 20140303814 A1, EP 2737798 A2, CN 105035325 A, US 20190037828 A1, WO 2017106903 A1, BR 102014011793 A2, CN 104176254 A, CN 105613483 A and CN 106114863 A.

* cited by examiner

FIG. 5
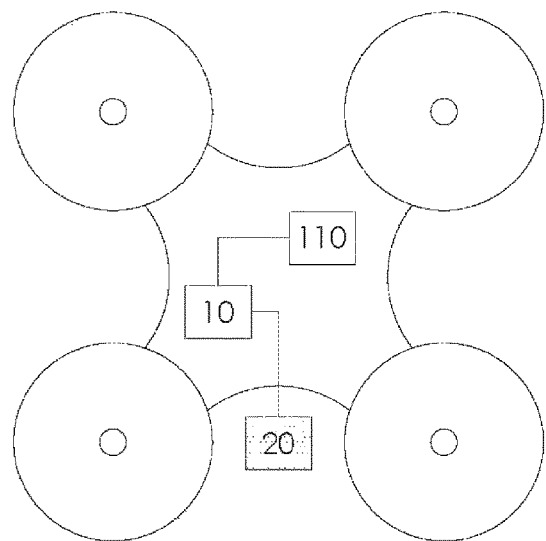
FIG. 5A
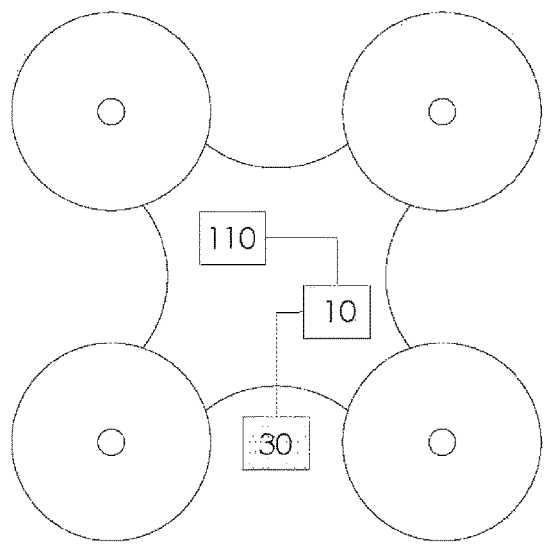
FIG. 5B
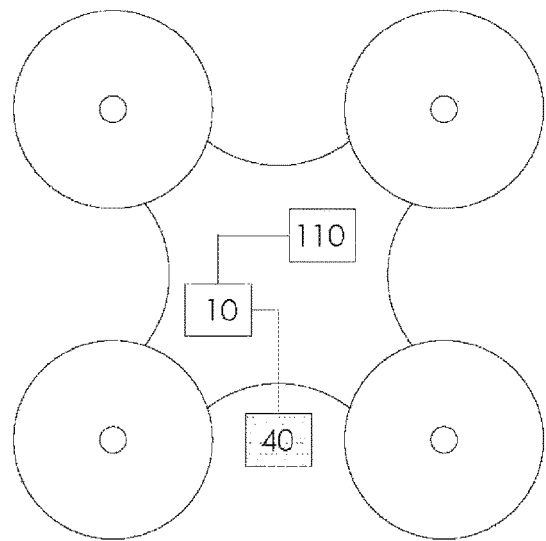
FIG. 5C
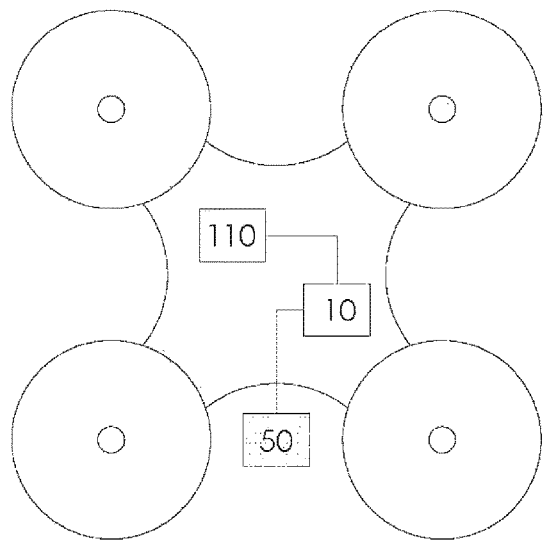
FIG. 5D ized officer, Fernando Garcia Nicodemos.

MULTI-PURPOSE ON-BOARD SYSTEM FOR INDEPENDENTLY RELEASING BIOLOGICAL AGENTS FOR PRECISION BIOLOGICAL PEST CONTROL

TECHNICAL FIELD

This disclosure relates to a multi-purpose embedded system for controlling the release process of different biological agents, wherein each dispenser has its own dispensation method, for the automation of the biological pest management by conventional means (e.g., persons on foot equipped with backpacks), land vehicles (e.g., motorcycles, tractors, Uniport agricultural machinery etc.), manned aircraft (e.g., agricultural or experimental aircraft, or other small aircraft, etc.) and unmanned aircraft (e.g., UAV [Unmanned Aerial Vehicle], RPA [Remotely Piloted Aircraft], drones, etc.). The depositor is the company NCB SISTEMAS EMBARCADOS EIRELI—EPP, and the inventor is its managing partner for research and development and the company's authorized officer, Fernando Garcia Nicodemos.

Generally speaking, in the complete version illustrated in FIG. 1, the multi-purpose embedded system can be built to operate with four different dedicated electromechanical dispensers, respectively named BioBOT—Loose Parasitic Egg Release Assembly (20), BioCOTe—Loose Mass Release Assembly (30), BioMITe—Live Material (Mite) Release Assembly (40) and BioFUNgus—Powdered Beneficial Fungus Release Assembly (50), activated and controlled individually or simultaneously by means of a control cable (1), simply referred to as a release assembly or "dispenser," for each different biological agent, which gathers the loose material from a storage compartment and performs controlled and/or geo-referenced release using the aforementioned equipment and vehicles; and a multi-purpose electronic control device (10), which, when configured and/or connected to a portable computer (70), with or without a cable, via Bluetooth interface (2), controls the exact amount of biological agents to be released by the release assembly or "dispenser" in mL/ha (milliliters per hectare) or g/ha (grams per hectare) or mL/min (milliliters per minute) or g/min (grams per minute), with individual or simultaneous activation of one or more release assemblies, pursuant to FIG. 1.

This multi-purpose embedded system can connect or be controlled by other navigation and guidance systems available on the market by means of a standardized communication interface and used in the aforementioned equipment and vehicles. It can also be connected or controlled by a human-machine touchscreen interface (60) via a control cable (1), or by a portable computer (70) (e.g., smartphone, tablet PC, portable computer, drone on-board computer, etc.) via the Bluetooth interface (2) with radio control support (80) from the vehicle (100) (e.g., drone) connected by radio signal (4), connected via USB cable (5), whose software or application enables the management and configuration of the multi-purpose embedded system with cloud support, with data transfer via the Internet (3), as well as mission planning and geo-referenced digital mapping of the area of release by means of a Mission Planner, developed specifically for compatibility and autonomous operation of the four mechanical dispensers individually or simultaneously, also illustrated in FIG. 1.

The multi-purpose embedded system, along with the information it generates, may be managed through a cloud-based software system (90), for remote tracking, mission planning, generation of pre- and post-release profiles, automatic pest monitoring and creation of follow-up and release reports, also illustrated in FIG. 1.

The embedded system that is the subject of this disclosure patent application has its primary application in the agricultural area for the release of loose biological agents for accurate biological pest management in crops.

The application of biological agents can be compared with the liquid spray system, the subject of patent BR1020140117938, authored by private individual Fernando Garcia Nicodemos, managing partner of NCB SISTEMAS EMBARCADOS EIRELI—EPP. Despite the similarity, this system cannot be used or adapted to this new patent application because the release of "dry" live material (biological agents) has particularities that differentiate it from what is undertaken and optimized with regard to liquid products.

Despite using some state-of-the-art knowledge of the hardware techniques, the subject of the previous patent, the hardware and software interfaces and electromechanical requirements in order to release different biological agents comprise the subject of this new patent.

BACKGROUND

Currently, one of the main challenges in agriculture worldwide is to achieve an optimal economic, social, environmental and safety balance. Biological pest management is one of the oldest tactics used by humans. Due to several imbalances caused by the indiscriminate use of organic insecticides and new awareness regarding environmental issues, biological management and its innovations in the area have been expanding worldwide. "The basic premise of biological management is to manage agricultural pests and disease-transmitting insects by using their natural enemies, which may comprise other beneficial insects, predatory mites, parasitoids and micro-organisms, such as fungi, viruses and bacteria."

With the development of precision agriculture, embedded electronic navigation systems in land and aerial vehicles (e.g., tractors, motorcycles, manned and unmanned aircraft, etc.) have increasingly been adopted and are now indispensable. Although there are other satellite navigation systems (e.g. GALILEO—European system, GLONASS—Russian system, etc.), the vast majority of the receivers built into this kind of equipment use the North American GPS—Global Positioning System. More recently, receivers have emerged which use a combination of more than one, or all, of these systems at the same time, thus making solutions more accurate.

In general, the Brazilian market today still contrasts with this evolution with regard to the currently-employed biological management processes: manual release. To illustrate the procedures currently used for release, as well as the comparison with the innovations that are the subject of this patent, four different main biological agents and their loose "formulations" can be taken as a reference (although not limited to these), related to the four dispensers that comprise the subject of this patent: *Trichogramma galloi* (in the form of loose parasitic larvae), *Cotesia flavipes* (in the form of loose masses), *Neoseiulus californicus* mites (in a loose live form) and the beneficial fungus *Beauveria bassiana* (in loose powder form).

The most common procedure currently used to undertake biological management with *Trichogramma* is manual distribution of small pieces of cardboard containing parasitic larvae "stuck" inside (e.g., eggs parasitized with *Trichogramma*) in parallel bands, with pre-defined intervals between each band, in order to ensure coverage of the desired area (sections or entire areas).

The procedure for biological management using *Cotesia* is similar to that for *Trichogramma*; however, small plastic (non-biodegradable) cups or cardboard capsules, which may or may not be biodegradable, containing a group of *Cotesia* pupae masses are used After the insects are born from these masses, the plastic cups are opened and distributed in parallel bands and at pre-defined points within each band, in order to ensure coverage of the desired area (sections or entire areas).

Similar to the procedures presented above, *Neoseiulus* mites are distributed manually using standard bottles or sachets at the pre-defined points within each band, in order to ensure coverage of the area desired (sections or entire areas).

This method only allows small areas or greenhouses to be covered. Some attempts at automation have been made, which are described later.

In the case of the *Beauveria* fungus, the most commonly-used procedure is liquid spraying, after mixing this material with water. There is still a dearth of available equipment that can undertake dry spraying of these fungi, in loose powder form.

To better define the conditions linked to the state of the art, FIG. 2 provides a general illustration of the procedures currently adopted by users (A1, A2 and A3) to release *Trichogramma* and *Cotesia* insects, as well as *Neoseiulus* mites, wherein line (L1) defines the boundaries of the area to be covered by the manual release, line L2 defines the limits of the total area not covered due to the limitations of manual release, lines F1, F2, F3, F4 and F5 indicate the parallel bands where the release occurs and circles C1, C2, C3, C4, C5, C6, C7, C8, C9, C10, C11, C12 and C13 indicate the pre-defined intervals between each band where this manual distribution should be undertaken, within the limits of L1, considering the radius of action of the biological agents.

FIG. 3 provides a general illustration of liquid material spraying (e.g. pesticides), which includes the liquid spraying of the *Beauveria* fungus, where the agricultural aircraft (V1) sprays the total area (L1+L2), lines F1, F2, F3 and F4 indicate the parallel bands where superimposed spraying of the liquid should occur over the total area and lines B1, B2 and B3 illustrate the returns ("loops") of the agricultural aircraft.

1) State of the Art and its Evolution

Increasing efficiency and productivity with the aim of reducing environmental costs and impacts is an age-old and well-known concern in the global agricultural market. In the Brazilian market, the growing pressure by farmers for more efficient processes and the advancement of biological pest management has contributed to the depositor, through the corporate entity that he manages, becoming a new player with its products. Accordingly, process automation for the release of biological material, interconnected with GPS navigation systems, has become the inevitable solution, and it is indispensable to enable coverage of greater areas with greater efficiency and to ensure the proper release timeframes for live material.

However, the lack of automated release solutions for use on a larger scale is still a hindrance for the use of more efficient methods, such as agricultural aviation, motorcycles, tractors, drones, etc., in the Brazilian biological pest management market, especially precision methods. Thus, the state of the art will be defined in two stages, within its evolution. The first is the "state of the art," where several reference articles will be presented in the area, and the second is the "state of the art" itself, where solutions intended to automate the release of biological agents in general will be presented. Lastly, a brief comparative summary will be presented between the current status of these solutions and the innovations and benefits of the system that is the subject of this disclosure, with the intention of demonstrating the differentiation and evolution that are intrinsic to the disclosure.

A) State of Knowledge

The process of releasing biological material involves several aspects, such as release type and technique, whether the material is loose or encapsulated, quantity of personnel available to perform the task, available equipment and vehicles, among other aspects.

Although this selection is not exhaustive and it is known that there are other works related to this area, this item will present several academic reference works in order to demonstrate the state of knowledge with a focus on manual release techniques, by land-based methods and some aerial application methods, to be able to operate on a larger scale.

Commercial release of material for biological pest management is currently undertaken in more than 12 countries, in addition to Brazil, including Russia, China and European countries. Manual release techniques are most frequently used in countries where production costs are relatively low, while in more developed countries, reduction in production costs is achieved by mechanization of the release process. With the growing use of biological management, new techniques and new release processes require development in order to increase efficiency and precision, access to large areas and to reduce the time and costs involved.

1—Evaluation of the Release of Loose Parasitized Eggs—Wasps (e.g., Biological Agent *Trichogramma galloi*)

The release of eggs parasitized with *Trichogramma* on land, via manual distribution, is the most common method reported in the literature, such as ALLEN, BURBUTIS, RIDGWAY, BIGLER, LOPES, NEIL and PROKRYM. These can be released in a protected or unprotected manner, in the form of eggs, pupae or adults. Previously, this material was placed directly on the crop at release points, as presented by STINNER. However, today, most of this work involves the release of this material attached to a substrate of cardboard or several types of paper (waxed, filter paper, etc.), as illustrated by SMITH. These substrates are distributed at duly-chosen release points and attached to the plants by string, clamps or clips, in a number of different crop species, as presented by ALLEN, DOLPHIN, HASSAN, HULME and NEWTON (based on FIG. 2). In some works, such as PROKRYM, paper cards or strips were used, which are placed between the leaves of the plants In most studies, such as SMITH, the material is distributed manually at specific points, although in some cases, such as ABLES, the containers are placed mechanically by a vehicle in movement. Techniques based on release at different points, such as that put forth by GUSEV, present some drawbacks, such as the need for an even distribution throughout the entire area, and spacing between them should allow for the dispersion of material throughout the area in a uniform manner. Accordingly, several researchers have tried to develop techniques for distribution by dispersion or spraying of *Trichogramma* eggs or adults, rather than distribution at specific points.

PINTO assessed the efficiency of different techniques for releasing *Trichogramma* to manage sugarcane borer (*Dia-

*traea saccharalis*) eggs in the state of Sao Paulo, Brazil. The authors found that in cold or rainy periods, the release of *Trichogramma* in the pupa phase, protected in paraffin wax boards, was the best technique when compared to the release of adults or unprotected pupa, and this method guaranteed four times the rate of parasitism. On warm, rainless days, all the techniques had similar results. With these releases, PINTO observed a reduction of up to 100% of the sugarcane borer eggs on the leaves. From a previous work, several others were conducted in Brazil by several authors, in an attempt to improve the release techniques. Several experiments conducted in the state of São Paulo, such as those by PINTO and YOKOJI, have indicated satisfactory pest management efficiency with *Trichogramma* in association with chemical control, using releases of 200,000 adult insects per hectare per week, for three consecutive weeks. Releases of 100,000 adult insects per hectare in less than three weeks were not efficient, as illustrated by YOKOJI, ARCARO, AFONSO, SCANDIUZZI and GOMES.

In one of the first attempts to mechanize the application, SCHUTTE developed a sprayer to apply parasitized eggs to apple orchards. ABLES used a compressed air sprayer to apply *Trichogramma* in the field, based on the results obtained by other researchers. He concluded that the technique was not adaptable to *Trichogramma*, especially for large-area applications. In the USA, NORDLUND developed a manually-started pneumatic sprayer to release parasitized eggs on cotton crops. This sprayer, coupled to a 15.2-meter hose, allowed for application over an area of eight rows wide and 15.2 meters with a single spray point. Using this same technique, JONES added crumb flakes to the parasitized eggs, applying through a modified seeder. It was the test of the first large-scale dispersion release of the *Trichogramma* genus in that country, at a density of 176,000 to 247,000 insects per hectare.

Later, also in the USA, GROSS developed a system comprising a peristaltic pump, a current and a centrifugal fan to release parasitized eggs over the tops of cotton plant, at a density of 244,000 insects per hectare. These authors concluded that the systems developed could be used commercially for land-based applications, achieving uniform insect distributions and without damaging them. HAJI applied *Trichogramma* via a central pivot system, in Petrolina—PE [Pernambuco], and this release system was found to be practical, efficient and low-cost.

Some authors tested aerial applications of biological agents during the 1980s and early 1990s. In 1990, HOPE presented the results of studies of equipment developed by his team, and tested it in forests from 1982 to 1985. A Bell 47 helicopter was used in these tests. The equipment comprised simple electrical components, mechanical components from a small planter and a centrifuge deflector used for sowing pine trees. In Canada, in the same year, SMITH modified a manual ventilation device for the distribution of loose parasitized eggs in forests, in order to simulate aerial application. In Russia, BARABASH adapted a device to the valve of an aerial sprayer and tested it successfully at the production scale, using a helicopter. He achieved releases with speeds up to 100 m/s, with an accuracy of ±10% of the nominal value. Other tests also involving aerial spraying are reported in the works of KIKU of 1993 and GARDNER of 1996.

2—Assessment of Mass Release—Wasps (e.g., Biological Agent *Cotesia flavipes*)

Biological management using *Cotesia* has been successfully performed since the 1970s, currently harvested in large commercial scale at plant laboratories and in companies throughout Brazil. Currently, releasing this biological agent is costly, since the most common release procedure is also manual (such as that illustrated in FIG. 2), requiring large teams of employees for this activity alone. As the success of a biological management program may be undermined by the release technique used, as illustrated by PINTO, several researchers have evaluated alternative release methods, reducing the need for labor.

Compared to *Trichogramma*, for example, where alternatives for the release of loose parasitized eggs by land and aerial methods have already been tested, *Cotesia* presents significant challenges, due to the fact that the pupae are grouped together by means of a silk thread, characterizing a group of masses (similar to the grouping of cotton threads), in a much greater volume. Predation is a significant problem when these *Cotesia* masses are released into the field. However, this problem is minimized when the material is applied manually to the plant leaves after birth, where the rate of predation is lower or when a larger quantity is released to compensate for predation, as demonstrated by MILLS, MARTINS and OLIVEIRA. In this context, a group of masses is stored inside small plastic cups, where birth is monitored. Once the wasps are born, these cups are released into the field.

In addition, it was believed that, in order to perform automated release, the pupae should be physically or chemically separated from the masses, because the release of whole masses, before their birth, would cause the technique to fail, due to predation, according to FABBRIS and SISDELI. However, the use of powdered predator repellents may suppress this separation stage, according to work by RODRIGUES and VINHA, thus eliminating the need to implement another process and handling during the industrialization of this biological agent. Natural or compound products were tested by RODRIGUES and VINHA, indicating that some of them could be used as repellents, without affecting the biology of *Cotesia*. PADUA tested several repellents in the field, including trichloroisocyanuric acid. Satisfactory results were not forthcoming, probably due to the use of experimental containers sealed with plastic film. This packaging of the masses prevented escape of gases formed by the acid, leading to mortality in adults; however, it was concluded that nutmeg should be included in mixtures of repellents to the *Cotesia* masses. On the other hand, in aerial releases, PEDRAZZI indicated that the repellents should be mixed at the time of their release, with the best options being in the following concentrations: a) 0.10 grams of trichloroisocyanuric acid plus 0.05 grams of nutmeg for every five masses; or b) 0.10 grams of trichloroisocyanuric acid plus 0.10 grams of nutmeg for every five masses; or c) 0.10 or 0.25 grams of trichloroisocyanuric acid for every five masses.

3—Assessment of the Release of Live Material—Mites (e.g., Biological Agent *Neoseiulus californicus*)

Biological control using mites has been carried out mainly in small and medium sized plantations and greenhouses in Brazil and worldwide. Like *Trichogramma* and *Cotesia*, the release of this biological agent is also costly (as illustrated in FIG. 2). The procedure is also manual and requires large teams of workers. This is the most commonly-used procedure, which can be performed with the live material mixed with a substrate (e.g., vermiculite), packed in standardized containers.

The red spider mite (*Tetranychus urticae*) is considered a key pest in several economically-important crop species MORAES and FLECHTMANN. The main species of mites used in biological management programs are: *Phytoseiulus*

*persimilis, P. macropilis, P. longipes, Neoseiulus californicus* and *Galendromus occidentalis*. In Brazil, the use of *Neoseiulus californicus* and *P. macropilis* has been especially widely-used in strawberry, chrysanthemum, gerbera, apple and peach plantations, among others, in order to manage the red spider mite (FERLA, POLETTI, BELLINI, SATO, MONTEIRO and WATANABE).

In order to assess the agronomic efficiency of *Neoseiulus californicus* for biological management in strawberry plantations, a study was conducted in a commercial strawberry production area, located in the municipality of Estiva—MG [Minas Gerais] (BUENO and POLETO). Accordingly, two sites measuring approximately 50 m$^2$ each were isolated.

In one of these sites, the red spider mite was managed conventionally, using acaricides registered for strawberry crops. In the other area, the crops were managed with the release of predator mites, at the moment that the first dead spots caused by this pest were detected. With each release, five *Neoseiulus californicus* mites were introduced per square meter. Population fluctuation was estimated in each of the areas (conventional and biological management).

Sampling was performed every two weeks for a period of 100 days.

It was observed that management with acaricides was not efficient, and the infestation was about 40 times higher than that observed in the area where predatory mites were released for biological management. This result demonstrated that the introduction of the *Neoseiulus californicus* predatory mites at the beginning of the red spider mite infestation is efficient, and can maintain population density below the level of economic damage over a long period of time.

The feasibility of the combined use of *Neoseiulus californicus* and *Phytoseiulus persimilis* mites, also broadly used for the biological management of red spider mites in the cultivation of vegetable and ornamental plant crops in several European countries and the United States, has been reported by several authors (ZHANG, SANDERSON, SCHAUSBERGER, WALZER, BLÜMEL and RHODES).

In order to introduce *Neoseiulus californicus* at the correct time, periodic monitoring for red spider mite outbreaks is of fundamental importance. Accordingly, equipment that can automate and assist in the most efficient release of these materials in the field is extremely relevant.

4—Assessment of the Release of Beneficial Fungi in Powder Form—Fungi (e.g., Biological Agent *Beauveria bassiana*)

Biological pest management using fungi has been shown to be extremely efficient in open fields. The current release procedure involves liquid spraying by mixing this biological material with water or other applicable viscous liquid (as illustrated in FIG. 3). This spraying is mainly conducted with the main types of spray equipment available on the market (e.g. agricultural aircraft, tractors, etc.) and it can be managed with the equipment that is the subject of patent BR 102014011793-8.

Due to the technological challenges, the technique of powder-only dispersion is not yet employed in Brazil or worldwide, and there are no references in the literature with regard to tests that make use of this technique.

B) Status of the Technique

1—Assessment of Apparatuses and Commercial Products for the Automated Release of Loose Parasitized Eggs (e.g., Biological Agent *Trichogramma galloi*)

The starting point is an old patent, directly related to one of the proposed topics. In 1981, MAEDGEN obtained the patent entitled "Method and Apparatus for Airborne Release of Insect Eggs" (U.S. Pat. No. 4,260,108). This is a very old patent and there are no further references, other than the disclosure concept itself; that is, no commercial products stemming from this concept were encountered, in addition to the fact that this patent is not applicable to Brazil. Release from the apparatus is managed by manual adjustment of several standardized orifices, in order to estimate the amount of material released and, in fact, there is no control over the actual quantity released.

Practical initiatives involving the release of parasitized eggs by agricultural aviation began to intensify in the late 1990s and early 2000s. More recently, in 2002 in the USA, MILLS submitted a report drafted for the California Department of Pesticide Regulation. He performed the first tests of apparatuses intended for the aerial application of *Trichogramma* in apple orchards, using purely mechanical components. MILLS continued to develop his work, although, according to a reference by CENTER in 2008, the apparatuses used for the aerial application of *Trichogramma* were still under development at that time. No patents were found, either for this apparatus or any commercial exploitation related to the work by MILLS and CENTER.

In Australia, aerial application began in corn crops in Queensland, with the BIORESOURCES initiative. Loose eggs are mixed with semolina at a ratio of 1:10. One liter of the mixture is sufficient to cover 50 hectares. A standardized plastic bottle is coupled to a distribution line in the cockpit, and release is controlled manually by means of a mechanical valve. No detailed information or operating manuals were found for either of these initiatives.

The commercial release of loose *Trichogramma* eggs began on a large scale in Brazil in 2013, on the initiative of the applicant of this patent, with financial support for scientific, technological and innovation proposals by CNPq (Conselho Nacional de Desenvolvimento Científico e Tecnológico [National Council for Scientific and Technological Development]), under process No. 454356/2013-7, entitled "SECa-BuG: Embedded Automatic Biological Management System (Development of a New Apparatus for the Automation of Parasitoid application via Agricultural Aircraft). NCB markets SECa-BuG for the release of loose parasitized eggs by motorcycles and agricultural and/or light aircraft. This apparatus enables the release and fixed control of the release rate in grams per hectare, without GPS integration. Using a motorcycle, it is possible to cover 40 hectares per hour (320 ha in an eight-hour shift), whereas in manned aircraft, it is possible to cover around 1,000 hectares per hour. This simplified equipment has not been patented and has been marketed by NCB since 2013.

In 2014, a version of SECa-BuG was made available for operation by the AGX-TRANSPRESERV company, and an intellectual property protection and non-disclosure agreement (NDA) was entered into by the parties. Recently (2017), NCB was made aware that TRANSPRESERV not only reverse-engineered the apparatus, resulting in its own initial version, but it also operationally marketed the SECa-BuG apparatus without the knowledge of NCB. Another company, MTB SERVIÇOS AÉREOS ESPECIAS, in partnership with TRANSPRESERV, developed a second version of the apparatus similar to that proposed by SECa-BuG, which was subsequently marketed at specific sites (e.g. DRONECENTER). Accordingly, the proponent has no more information with regard to these apparatuses and it is unaware of any patent applications submitted by these companies. Nevertheless, they should be mentioned as apparatuses that have produced state-of-technique commercial results. This issue is currently being resolved by NCB with the leadership of these companies.

More recently, due to the innovations in this market and due to the characteristics of the paid load to be released, proposals for the use of Remotely-Piloted Aircraft, also known as Unmanned Air Vehicles (UAVs) or drones as a means for the release of this kind of material, have also been encountered. Abroad, the tests involving release from drones are quite old, but they began to be conducted more seriously from the end of 2015, and this is now one of the main means of release.

The vast majority of solutions involve experimental cases with adapted systems with low levels of autonomy. YONG-LAK performed successful tests with a UAV, delivering biological management "bombs." Each cardboard bomb contains several compartments with parasitized eggs inside, enabling a large quantity to be released in its activation at specific points. The system proposed by YONG-LAK comprises a radio-controlled helicopter carrying a device for the storage and launch of these bombs. The German company HEIGHTTECH adapted and tested a release system on its drones. It used a plastic bottle to store parasitized eggs and a simplified system to continuously spray them during flight. There is no information on patents and commercial operations for either solution. Italian company SPORT TURF CONSULTING performs commercial releases from a spherical capsule-based system containing parasitized eggs. This apparatus stores the capsules, triggering release at specific pre-planned points. Italian companies SOLEON and AERMATICA3D have developed apparatuses for releasing similar capsules. In 2017, Canadian company ANATIS BIOPROTECTION, a manufacturer of biological agents, conducted tests with a capsule launching apparatus equipped with a standard storage compartment for releasing loose parasitized eggs with *Trichogramma*. It compared both methodologies and ascertained the technical viability of both, directly in the field. KOPPERT has a mechanized apparatus for releasing its own capsules containing eggs parasitized with *Trichogramma* (HUNTER).

No patents were encountered for this apparatus.

In Brazil, in 2015, XFLY developed a dispenser for loose eggs in the shape of a rotating sphere coupled to the bottom of the apparatus, sold exclusively with its own line of drones, called X800 BIO. The eggs are placed at the bottom of the sphere and, when it rotates, they are released in a continuous manner, similar to an endless thread. It is reported that this system has been patented, although the patent number and name of the holder have not been reported. GEOCOM, a services company, uses the XFLY product to release loose parasitized eggs. In mid-2016, AEROAGRI developed a simple solution, based on the endless thread model, coupled to the bottom of the Phantom 4 DRONE, manufactured by Chinese company DJI. This solution also enables the continuous, but uncontrolled, release of eggs.

Also in 2016, ENGEGROW added a dispenser based on a rotating sphere to its portfolio, similar in operation to the XFLY model. It is not known whether patent applications have been submitted by either company.

The NCB solution to automate the release of parasitized eggs, such as loose eggs parasitized with *Trichogramma galloi*, is the BioBOT dispenser (20—illustrated in FIG. 1), evolution of the SECA-BuG apparatus. Preferably, it will be installed in drones (100), according to the configuration illustrated in FIG. 5A and the claims in FIGS. 6 (21, 22 and 23). BioBOT will be the registered trademark for this NCB product.

2—Assessment of Apparatuses and Commercial Products for the Automated Release of Loose Parasitized Eggs (e.g., Biological Agent *Cotesia flavipes*)

As previously presented, the release of *Cotesia* is still predominantly performed manually through the means of plastic cups, after birth. The methods for the mechanized release of *Cotesia* make use of the same principle and they always involve an encapsulated format and always with release after the birth of the insects. As yet, there are no apparatuses for dosing, separating and releasing loose masses before birth, which is the subject of this patent.

Recently, several companies in Brazil and abroad have developed apparatuses with the purpose of mechanizing the release of *Cotesia*. In 2015, one of the first companies, GEOCOM, initially developed an apparatus to load, handle and release small cardboard boxes. This box was developed to market, transport and release *Cotesia* from drones (this box is the subject of a third-party patent application). The mechanical apparatus is based on several racks coupled to the drone, where closed boxes are stored and stacked. The apparatus creates an opening (makes a "hole") and releases them individually as the drone advances.

Recently, this same company evolved its mechanized system to store and release cardboard tubes in order to increase the storage capacity in the drone and increase its operational autonomy. The tubes are also the subject of a patent application. Currently, there seem to be no patent numbers for these mechanized apparatuses. ONE SOLVE presented a system similar to GEOCOM at the 2018 Agrishow trade fair. However, the system used a system similar to manual release, because plastic cups were stored and stacked in its rack. These cups are mechanically released, one by one, after an orifice is created for the insects to exit.

As an evolution, AGRIBELA developed a biodegradable spherical capsule in order to market, transport and release *Cotesia*. This capsule is the subject of a patent application by the company. In partnership with AGRIBELA, ARPAC developed the mechanized dispenser for these capsules, which, when coupled to a drone, enables the autonomous and georeferenced release of *Cotesia*.

Recently, SARDRONES developed an automated system for releasing *Cotesia*, based on the marketing of biodegradable sachets. This technique enables a greater level of acclimatization of the insects, due to improved contact between the birthed insects and the environment. This procedure has also been patented.

The NCB solution to automate the release of loose masses before the birth of wasps, such as the *Cotesia flavipes* wasp, with the addition of repellent, is the BioGOTe dispenser (30—illustrated in FIG. 1). Preferably, it will be installed in drones (100), according to the configuration illustrated in FIG. 5B and the claims in FIGS. 7 (31, 32 and 33). BioCOTe will be the registered trademark for this NCB product.

3—Assessment of Apparatuses and Commercial Products for the Automated Release of Live Mites (e.g., Biological Agent *Neoseiulus californicus*)

The release of mites is always performed with live material. To date, there are no marketing, transportation and release techniques that enable operations in other formats.

When released into the field, predatory mites are generally packed into plastic or cardboard bottles, containing inert material (rice husks, shredded corn cobs or vermiculite). In addition to facilitating the distribution of predators in the field, the use of this material is also important to ensure the survival of mites during transportation. Normally, the bottles used for this purpose have a hole in their lids, which is sealed with "voile" fabric or non-woven fabric (NWF), allowing for gas exchange and ventilation of the internal contents of the bottle during transportation, which is generally undertaken using polystyrene thermal boxes. During transportation, the bottles must remain horizontal inside the polystyrene boxes, in order to increase the useful area for the predators, thus avoiding cannibalism (POLETTI).

The most common procedure currently used for its release, similar to other material, is manual release. For the distribution of predators, it is recommended that each bottle be shaken in order to homogenize distribution of the contents of the packaging. Shortly thereafter, the bottle is opened carefully and its contents are distributed directly over the plants or onto the soil. Predator mites may also be distributed in the field in sachets, which are hung on the plants.

European biological management companies have used this type of packaging more commonly in greenhouses. When these packages are distributed in the field, a small opening allows the predators to exit. This process is normally slow and can take weeks (POLETTI).

There are several commercial alternatives to the mechanized distribution of these mites in greenhouses and open fields. KOPPERT has developed a system for manual distribution, called ROTABUG, as well as an apparatus for mechanized distribution, called AIROBUG. This apparatus uses the rails of available infrastructure in the greenhouses to move between the crops, releasing the material over the plants. It uses a purely mechanized system based on large fans to "blow" the material.

A miniaturized version in the form of a pistol, called MINI-AIRBUG, which uses the same distribution procedure, has been developed by the same company. In it, the bottles are coupled to the pistol and the apparatus "sprays" the mites when the pistol mechanism is activated, in conjunction with the associated fans. With this apparatus, workers can manually release material not only in greenhouses, but also in open fields. Recently, KOPPERT developed an apparatus to be coupled to the DJI MATRICE 600 DRONE. The apparatus is based on a rotary cylinder that enables storage and release through small orifices as it rotates.

In 2015, Michael Godfrey, a student at the University of QUEENSLAND, developed a mechanized apparatus coupled to a multi-rotor DRONE, designed to release *Neoseiulus* mites. A two-liter plastic bottle for the storage and release of mites was adapted to an endless thread mechanism. The main factor raised in the study was the concern regarding control of the volume of distributed agents, of the utmost importance for efficiency of biological management. No patents related to this apparatus were found.

AEROBUGS of Australia developed a mite dispenser apparatus coupled to a DJI M600 DRONE. The apparatus has a dedicated compartment with a lower centralized outlet. A device for mechanized release is coupled to this outlet.

Recently, GEOCOM has used the same *Trichogramma* release apparatus manufactured by XFLY, already described above, to release mites. However, in general, apparatuses for the release of predatory mites are concentrated on mechanized and manual mechanisms with little automation or integration with drones.

The NCB solution for automating the release of live material, such as *Neoseiulus californicus* mites with inert material (vermiculite), is the BioMITe dispenser (40—illustrated in FIG. 1). Preferably, it will be installed in drones (100), according to the configuration illustrated in FIG. 5C and the claims in FIGS. 8 (41, 42, 43, 44 and 45). BioMITe will be the registered trademark for this NCB product.

4—Assessment of Apparatuses and Commercial Products for the Automated Release of Fungi in Powder Form (e.g., Biological Agent *Beauveria bassiana*)

Currently, fungi are released in liquid form. Fungi are diluted in a mixture with water, which may or may not include other liquid material, at the exact time of release. Since liquid spraying is already in the state of the knowledge and technique, currently-available spray apparatuses can be used for automated and precisely-controlled release of this material, including the apparatus that is the subject of patent BR1020140117938, owned by NCB.

In this context, the development of a new apparatus for automation, control and release of fungi in powder form is regarded as an innovation in the biological management market.

The NCB solution to automate the release of fungi in powder form, such as *Beauveria bassiana*, is the BioFUNgus dispenser (50—illustrated in FIG. 1). Preferably, it will be installed in drones (100), according to the configuration illustrated in FIG. 5D and the claims in FIGS. 9 (51, 52 and 53). BioFUNgus will be the registered trademark for this NCB product.

2) Problems Inherent on Current Techniques

Although already widely used in the field, the main issue with regard to biological pest management is the manual release process (illustrated by FIG. 2), which is poorly efficient in terms of time and precision and, consequently, access is limited to the large areas.

The problem begins when, in general, in order to ensure coverage of a certain area, employees need to distribute biological material manually.

This coverage is limited to small areas, constituting a time-consuming process that requires a large number of workers. Because this is a manual process, this procedure makes large-scale release impossible and, consequently, greater accuracy and control of releases is also impossible.

Furthermore, the preclusion of large-scale release also makes it impossible for biological management and its associated technologies to achieve the level of precision and traceability in order to become mainstream, thus preventing it from replacing the use of agricultural pesticides more rapidly. The environmental benefits of sustainable biological management using manual release mechanisms may well be underexplored, compared to the efficiency of controlled autonomous releases using motor vehicles or drones, for example.

Considering the release systems currently available to competitors, mechanization has brought significant advances in general and a huge advance in terms of scale.

However, these mechanized systems do not permit control of the release rate, nor do they offer integration with digital mission planning systems connected to tracking systems. The result is a dose that is difficult to adjust and often inadequate for the intended purpose, in addition to offering little transparency in the reports sent to the contracting parties. Any variations in the speed of the vehicle, whether due to an operator's input or the environmental operating conditions, will directly reflect the efficiency of the airborne release.

In the assessment of competitors, their apparatuses do not allow for the release rate to be controlled, nor do they permit 100% digital planning of the areas to be covered.

This characteristic means that, in a certain area, some regions will receive excess material while others will receive insufficient material. Areas identified as failures or as having received insufficient release of material must be reassessed and additional releases must be considered, thus impairing the credibility of the operations. The release process must be repeated more than once according to the phenological phase of the plantation and the type and extent of infestation apparent. Therefore, any rework will result in further expenses with biological management operations and material, without taking into account the fact that there is an increased risk of intra-species competition (condition when the flooding of insects impairs biological management, due to the fact that they are in a saturated environment and the insects will compete with each other), thus reducing efficacy.

3) Analysis of the Invention Based on a Brief Comparison with Current Techniques Agriculture at scale in the current scenario is dependent on the use of technology to measure precision, not only biological management applications, but also in all other monitoring- and planning-related procedures.

Cultivated areas require efficiency and uniform release of material through the use of specialized vehicles, such as motorcycles, tractors, agricultural aircraft or drones, wherein traditional manual processes are not feasible, due to the vastness of the area of application.

The current plethora of the global positioning system (GPS) receivers has led to much greater precision in this procedure, with better planning, monitoring and guidance by the operator over the release area and, after completion of the procedure, assessment of the result by an agronomy engineer through detailed reports.

To ensure satisfactory results, a robust, accurate and rapid computing system is necessary, in order to assist in the planning and, especially, in the monitoring of the process. The application environment requires failure-tolerant, robust and highly-durable equipment.

It is also generally accepted that good digital planning of the areas, aided and integrated with available configurations for each dispenser and for each application thereof, increases efficiency and precision and considerably reduces the areas of failure during the release of material. Early calculation of better routes, optimal curves and relevant factors such as weather conditions, speed, height off the ground and inclination, among others, enable the process to be controlled from end to end. Considering the large number of variables involved in more precise calculations, the need for modern and accurate equipment with greater computing capacity is evident, in order to make the entire process more efficient. All of these variables can be configured and are unique characteristics of the multi-purpose electronic equipment (10 of FIG. 1), to operate in a customized manner with each dispenser individually or simultaneously. Configurations can be made to the BioMAP application and mission planner (this will be the trademark registered by NCB for the mission planner) for mobile devices (70) and/or the BioHUB cloud management system (this will be the trademark registered by NCB for the management system) for the desktop computer system (90).

In general, while the manual release process generates great difficulties both in terms of scaling the releases and process reliability, mechanized apparatuses and their low levels of automation do not have the precision and control necessary for optimized operations. Agronomic techniques and calculation algorithms cannot be widely implemented for an optimized operation focusing on the individual realities of each user (customization), making this approach unfeasible when it comes to precise biological management.

This disclosure connects software systems, applications, hardware and dispensers used in the automation of the process to release biological material, mainly, but not restricted to, pest management using drones as standard.

This disclosure uses a computational technique to seek improvements in the overall efficiency of the integrated product, automating the application process of biological material in an individual or combined manner with more than one type of material at the same time.

The method developed to undertake this work involved the latest technologies available on the market, some of which were 100% pioneered by NCB, with the support for research and development projects funded by the Research Support Foundation of the State of São Paulo (FAPESP, Fundação de Amparo à Pesquisa do Estados de São Paulo) and by the National Council for Scientific and Technological Development (CNPq).

This method made use of hardware with high-performance embedded processors (10), modern cloud-based computer development technologies, computer systems for client registration, management, automated billing, report generation, indicator generation and georeferenced customized mission planning applications (Google Earth maps) for smartphones, PCs and tablet computers, dedicated to precision biological management (70 and 90).

Techniques include calculation of digital routes integrating the dosing calculation for greater efficiency, definition of waypoints, definition of areas of exclusion and danger and complete mapping of the area in digital format. Thus, the adversities presented in the state of the technique have been overcome and possibilities for specific improvements and fine tuning are envisaged, which would allow for improved efficiency and automation of the release process, always ensuring the use of the most modern agronomic techniques specific for each crop. In order to better define results linked to the state of the art, FIG. 4 illustrates the general procedures adopted with the new multi-purpose embedded system, using the drone (V2), where biological material can be released at the rate calculated for each biological ingredient and for each dispenser individually or simultaneously, all precision-controlled by GPS, according to the dosing and digital planning of the total area (L1+L2), the lines F1, F2, F3, F4, F5 and F6 indicate the parallel bands where the release is to occur, calculated automatically by the software system for greater yield and lines B1, B2, B3, B4, B5, B6, B7, B8, B9 and B10 illustrate the returns ("loops") of the drone, which may be automatically altered during digital planning for greater yield. The dashed lines indicate the band of action of the biological material after birth.

In this version, the entire release process is tracked and monitored in real time and all data are sent to the cloud management system for the generation of indicators, reports and automatic billing.

Accordingly, comparing the technology of the present disclosure with the existing apparatuses that have already been introduced, the following differences are identified for each dispenser type:

1—Assessment of Apparatuses and Commercial Products for the Automated Release of Loose Parasitized Eggs (e.g., Biological Agent *Trichogramma galloi*)

a) Patent Belonging to MAEDGEN (1981), Entitled "Method and Apparatus for Airborne Release of Insect Eggs" (U.S. Pat. No. 4,260,108):

Practical issues: release is mechanized and the orifices that control the quantity to be released are adjusted manually; integration with electronic systems is practically non-existent; and reliability of the procedure is poor;

b) Product Manufactured by AGX-TRANSPRESERV-MTB SERVIÇOS AÉREOS ESPECIAIS:

Practical issues: the dispenser developed is very similar to the BioBOT principle of operation, as the first version is based on the latter. The second version was developed by the same group, and is also very similar to BioBOT. However, both versions did not enable the release rate to be controlled and releases are not reliable or traceable. Low accuracy and reliability of the release reports were reported by clients at the time;

N.B.: AGX-TRANSPRESERV-MTB SERVIEÇOS AÉREOS ESPECIAIS were partners in the same economic holding. All these companies have since ceased operations and they no longer provide services to their apparatuses "copied" from NCB products;

c) Product Manufactured by: SPORT TURF CONSULTING, SOLEON, AERMATICA3D, ANATIS BIOPROTECTION and KOPPERT:

Practical issues: the developed dispenser is based on a capsule release system. The mechanized release of capsules is not very precise and not very scalable, since a large volume is necessary to cover large areas. By increasing the volume of the compartments, efficiency and autonomy are undermined; Furthermore, it has been reported that the encapsulated release generates predation in the field; i.e., the accumulation of biological material at certain points can lead to mobilization of predators;

d) Product Manufactured by: XFLY-GEOCOM, AEROAGRI and ENGEGROW:

Practical issues: these companies' dispensers are mechanized, based on the endless thread concept. The mechanized release is not very precise, impairing the coverage of the areas and resulting in poorly homogeneous releases. Low levels of integration and control based on digital georeferencing does not enable integrated reporting, and thus, releases are not very transparent to users.

The multi-purpose embedded system that is the subject of this disclosure, configured for operation with the BioBOT dispenser, comprises the following innovations:

1) The dispenser operates in an automated manner and integrated with GPS, and it is possible to accurately control the release rate in milliliters per hectare;
2) The dispenser produces homogeneous doses over the entire area;
3) Efficiency and precision of the releases are excellent; that is, it is guaranteed that the biological material will be released in a rational and adequate manner, for the treatment of the area;
4) Digital planning of the areas to be treated using the best agricultural techniques is possible, thus enabling configuration and taking into account all the control variables and access to all the release and coverage data;
5) With a 100% digital process, the use of cloud-based computer systems is possible to generate indicators, automatic billing and reliable release reports, as well as the traceability of the entire process from production to release; and
6) The release of parasitized eggs has already been scientifically proven. It is perfectly suitable for large areas, ensuring scalability of the process;

2—Assessment of Apparatuses and Commercial Products for the Automated Release of Live Wasps (e.g., Biological Agent *Cotesia flavipes*)

a) Product Manufactured by GEOCOM:

Practical issues: the developed dispenser is based on a capsule release system. The mechanized release of capsules is not very precise and not very scalable, since a large volume is necessary to cover large areas. By increasing the volume of the compartments, efficiency and autonomy are undermined. In this system, the capsule is released only after the wasps are born. Accordingly, an orifice opens in the apparatus as the capsules are released into the field. Several difficulties with this system were noted, such as the inability of the farmer to verify whether the wasps were born prior to release and whether they were properly packaged for transportation. Other issues inherent in this technique are the production cost of the packages and their assembly time (it has been reported that each package takes an average of one minute to be assembled);

b) Product manufactured by ONE SOLVE:

Practical issues: the developed dispenser is based on a plastic cup release system. The mechanized release of these cups is not very precise and not very scalable, since a large volume is necessary to cover large areas. The issues with this technique are similar to those inherent in the solution proposed by GEOCOM, although there is an aggravating factor: the plastic cups are released into the environment, resulting in environmental and degradation problems;

c) Product Manufactured by AGRIBELA-ARPAC:

Practical issues: the developed dispenser is based on a biodegradable sphere release system. The mechanized release of these spheres is not very precise and not very scalable, since a large volume is necessary to cover large areas. The issues presented by this technique are similar to those inherent in the solutions proposed by GEOCOM and ONE SOLVE, but there is another relevant detail: the spheres require a manufacturing process for assembly, which increases their production time and raises costs;

d) Products Manufactured by SARDRONES:

Practical issues: the developed dispenser is based on a biodegradable sachet release system. It has solved several relevant issues, such as making it easier for farmers to verify the birth of the wasps prior to their release, greater adaptation of the wasps to the environment and the fact that they are easier to assemble and transport.

The mechanized release of these sachets is not very precise and not very scalable, since a large volume is necessary to cover large areas.

The multi-purpose embedded system that is the subject of this disclosure, configured for operation with the BioGOTe dispenser, comprises the following innovations:

1) The dispenser operates in an automated manner and integrated with GPS, and it is possible to control the separation and release rate of loose masses in milliliters per hectare, in an accurate manner;
2) The dispenser produces homogeneous doses over the entire area;
3) The efficiency and precision of the releases are excellent; that is, there is a guarantee that the biological materials are released in a rational and adequate manner to ensure treatment of the area;
4) Digital planning of the areas to be treated using the best agricultural techniques is possible, thus enabling configuration and taking into account all the control variables and access to all the release and coverage data;

5) With a 100% digital process, the use of cloud-based computer systems is possible to generate indicators, automatic billing and reliable release reports, as well as the traceability of the entire process from production to release;

6) It is possible to verify the birth of the wasps more easily;

7) It eliminates any manufacturing stage for packaging assembly, thus speeding up production time and facilitating packaging and transportation; and 8) The release of loose masses has been scientifically proven. It is perfectly suitable for large areas, ensuring scalability of the process;

3—Assessment of Apparatuses and Commercial Products for the Automated Release of Live Mites (e.g., Biological Agent *Neoseiulus californicus*)

a) Products Manufactured by KOPPERT:
 Practical issues: both the apparatus that operates on rails in greenhouses and the manual release system are based on forced ventilation, such that biological materials are "blown" over the top of the plants. Although functional, it is based on a mechanized system that does not allow for accurate control of the release rate. The most recently developed product for drones uses a mechanized rotating cylinder. The system releases material at specific points. Thus, in all the foregoing solutions, it is not possible to precisely control the rate and the need to define, for specific points, their limit or reach in larger areas;

b) Products Manufactured by AEROBUGS:
 Practical issues: this company's dispenser is mechanized, based on the endless thread concept. The mechanized release is not very precise, impairing the coverage of the areas and resulting in poorly homogeneous releases. Low levels of integration and control based on digital georeferencing does not enable integrated reporting, and thus, releases are not very transparent to users;

c) Product Manufactured by GEOCOM:
 Practical issues: the same device manufactured by XFLY, which GEOCOM uses to release parasitized eggs, is used to release mites in the crops. Thus, the same issues as presented above for this apparatus are also reported with regard to the release of mites.

The multi-purpose embedded system that is the subject of this disclosure, configured for operation with the BioMITe dispenser, comprises the following innovations:

1) The dispenser operates in an automated manner, integrated with GPS, and it is possible to control the release rate in milliliters per hectare in an accurate manner;

2) The dispenser produces homogeneous doses over the entire area;

3) Efficiency and precision of the releases are excellent; that is, it is guaranteed that the biological material will be released in a rational and adequate manner, for the treatment of the area;

4) Digital planning of the areas to be treated using the best agricultural techniques is possible, thus enabling configuration and taking into account all the control variables and access to all the release and coverage data;

5) With a 100% digital process, it is possible to use cloud-based computer systems to generate indicators, automatic billing and reliable release reports, as well as the traceability of the entire process from production to release; and 6) Releasing mites packaged in inert material is a scientifically-proven process. It is perfectly suitable for large areas, ensuring scalability of the process.

4—Assessment of Apparatuses and Commercial Products for the Automated Release of the Biological Agent *Beauveria*

Currently, the procedure for releasing fungi involves two processes. The first pertains to the production of the mixture, in which water is mixed with the fungi in powder form. The second pertains to sprayers that release the liquid material.

Spraying of liquid material is based on the state of the knowledge and technique and several innovative apparatuses are available on the market. One of these is the flow controller, covered by patent number BR1020140117938, submitted by the owner of NCB.

The main practical issue with liquid sprays is the large volume that vehicles have to carry and, accordingly, release in powder form could be performed with drones at a lower cost.

The multi-purpose embedded system that is the subject of this disclosure, configured for operation with the BioFUNgus dispenser, comprises the following innovations:

1) The dispenser operates in an automated manner, integrated with GPS, and it is possible to control the release rate in milliliters per hectare in an accurate manner;

2) The dispenser produces homogeneous doses over the entire area;

3) The efficiency and precision of the releases are excellent; that is, there is a guarantee that the biological materials are released in a rational and adequate manner to ensure treatment of the area;

4) Digital planning of the areas to be treated using the best agricultural techniques is possible, thus enabling configuration and taking into account all the control variables and access to all the release and coverage data;

5) With a 100% digital process, it is possible to use cloud-based computer systems to generate indicators, automatic billing and reliable release reports, as well as the traceability of the entire process from production to release; and 6) The release in powder form is still under study, but it is perfectly suitable for covering large areas at lower costs, through the use of lighter drones.

BRIEF DESCRIPTION OF THE DRAWINGS

The details of one or more aspects of the disclosure are set forth in the accompanying drawings and the description below.

FIGS. 5A-5D illustrate various operations of the drone, where FIG. 5A shows the drone operating for the release of parasitized loose eggs; FIG. 5B shows the drone operating for the release of loose masses; FIG. 5C shows the drone operating for the release of live inputs (mites); and FIG. 5D shows the drone operating for the release of beneficial powdered fungi;

4) Summary

Figure 1:
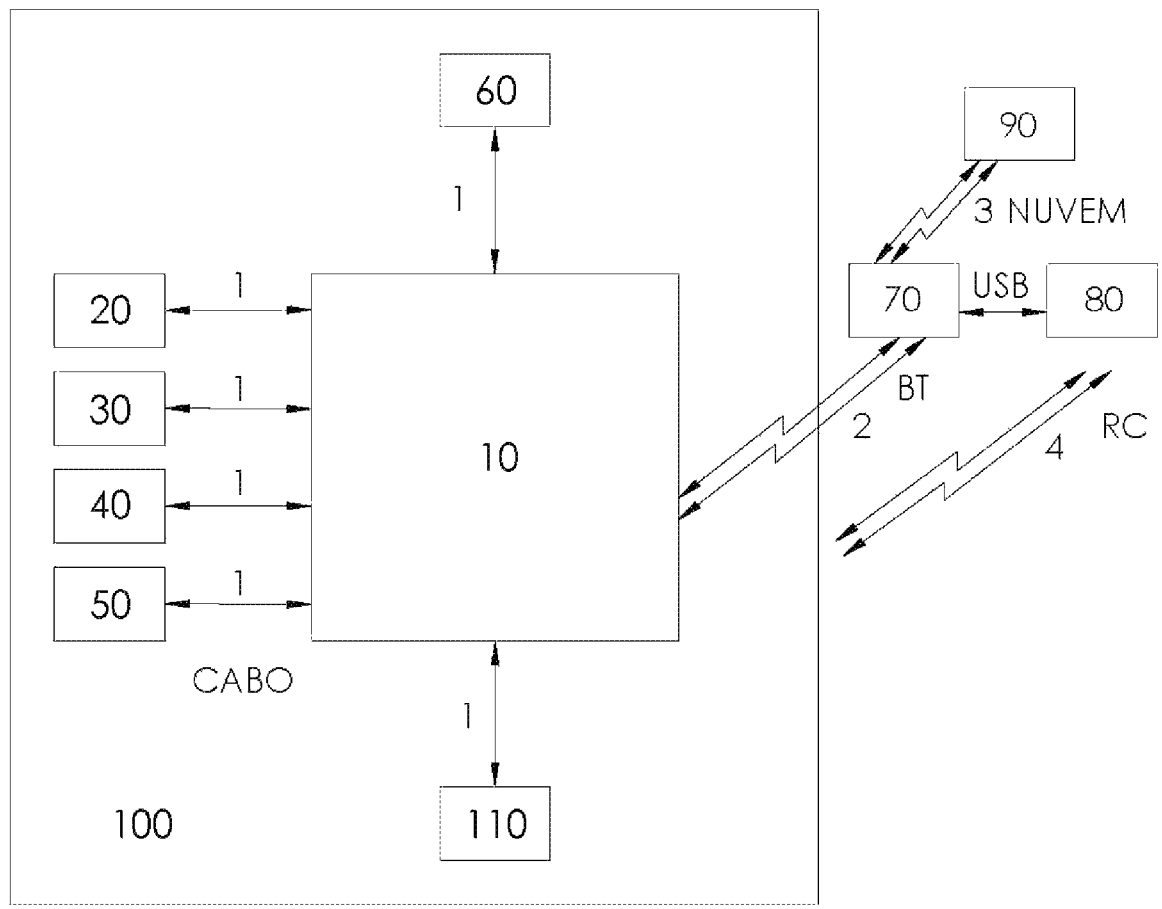
FIG. 1 is an overall schematic of the system according to the disclosure.
Figure 2:
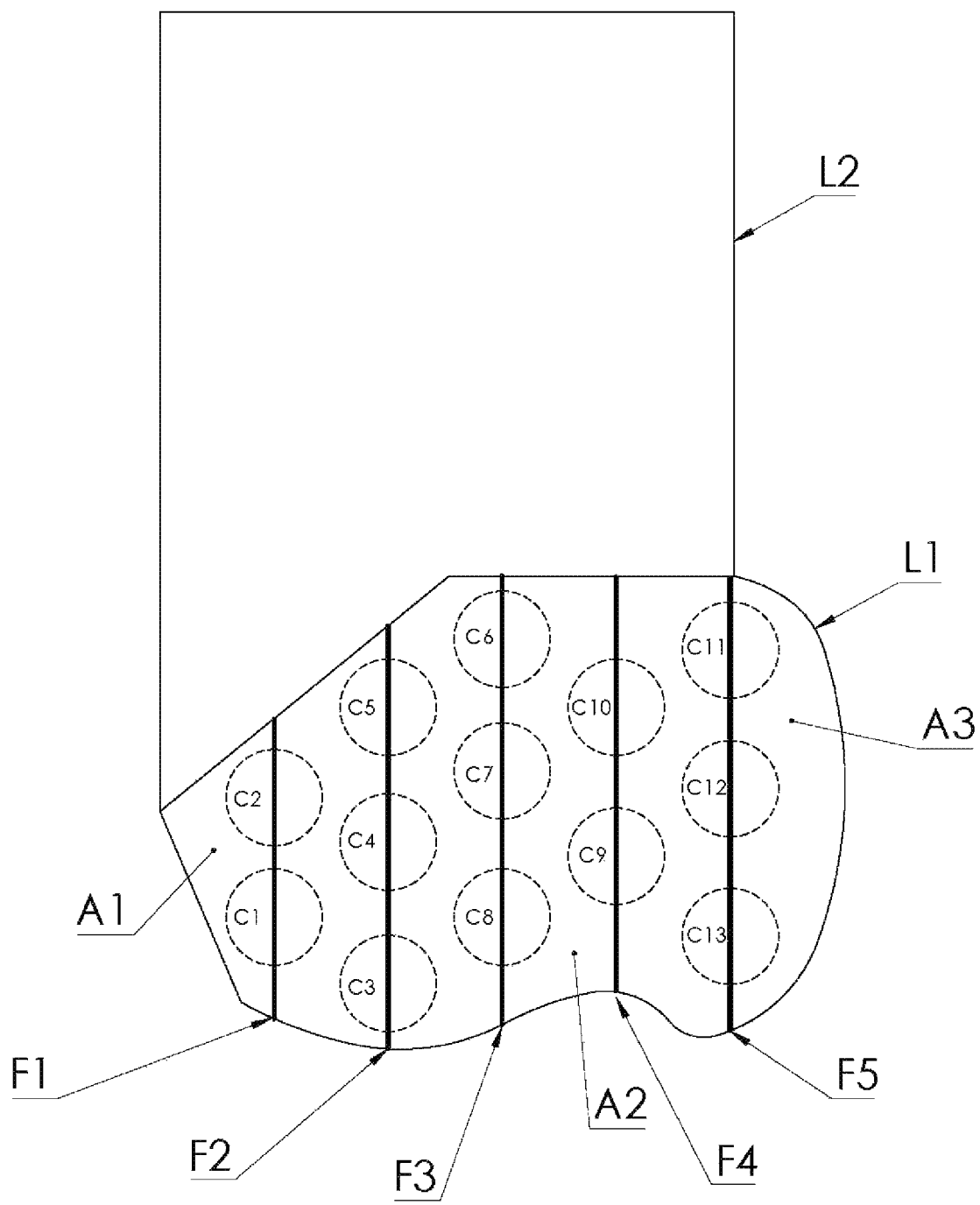
FIG. 2 is a representation of procedures relied upon for the release of *Trichogramma* insects.
Figure 3:
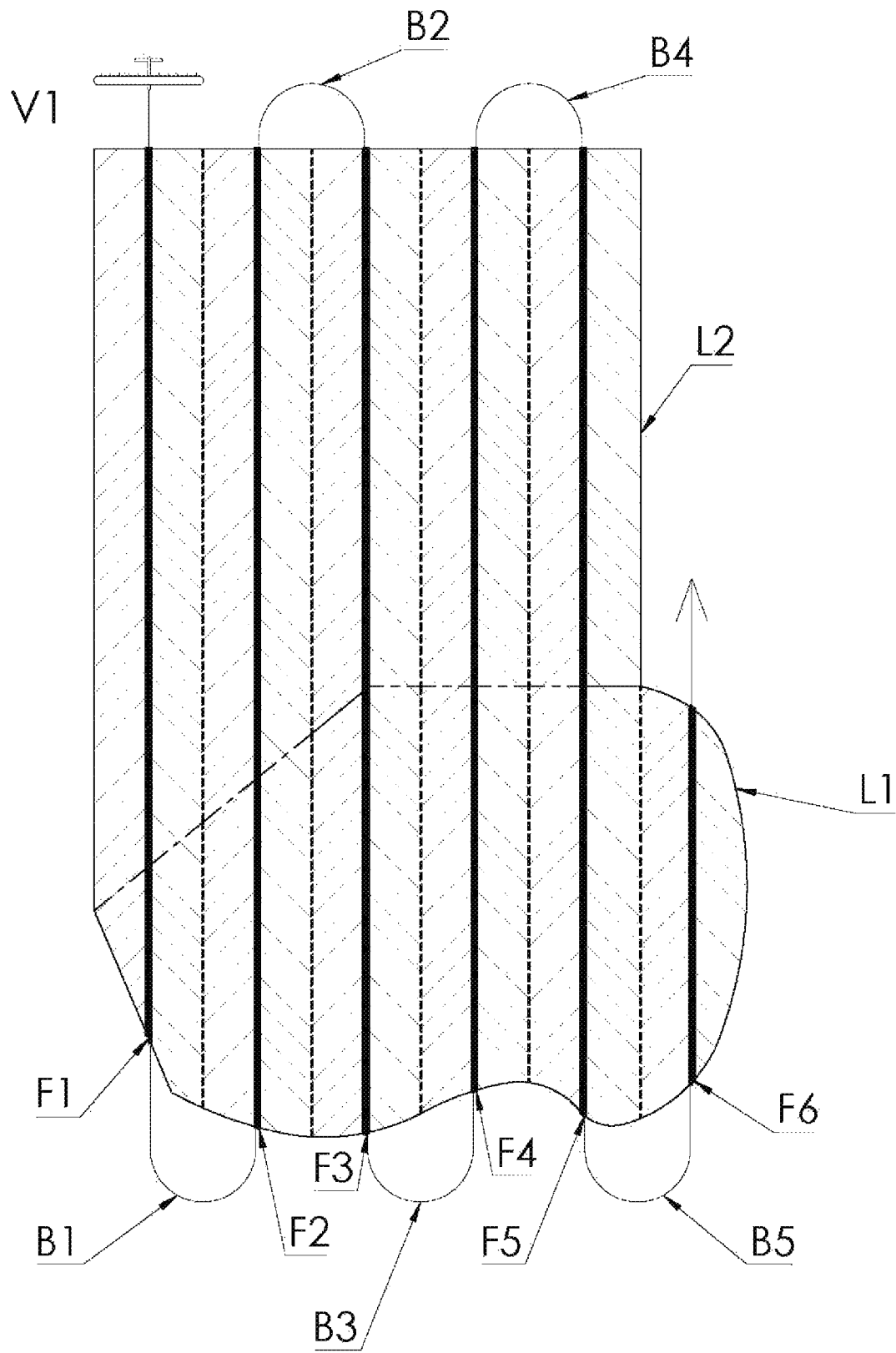
FIG. 3 is a representation of a process for spraying liquid inputs.
Figure 4:
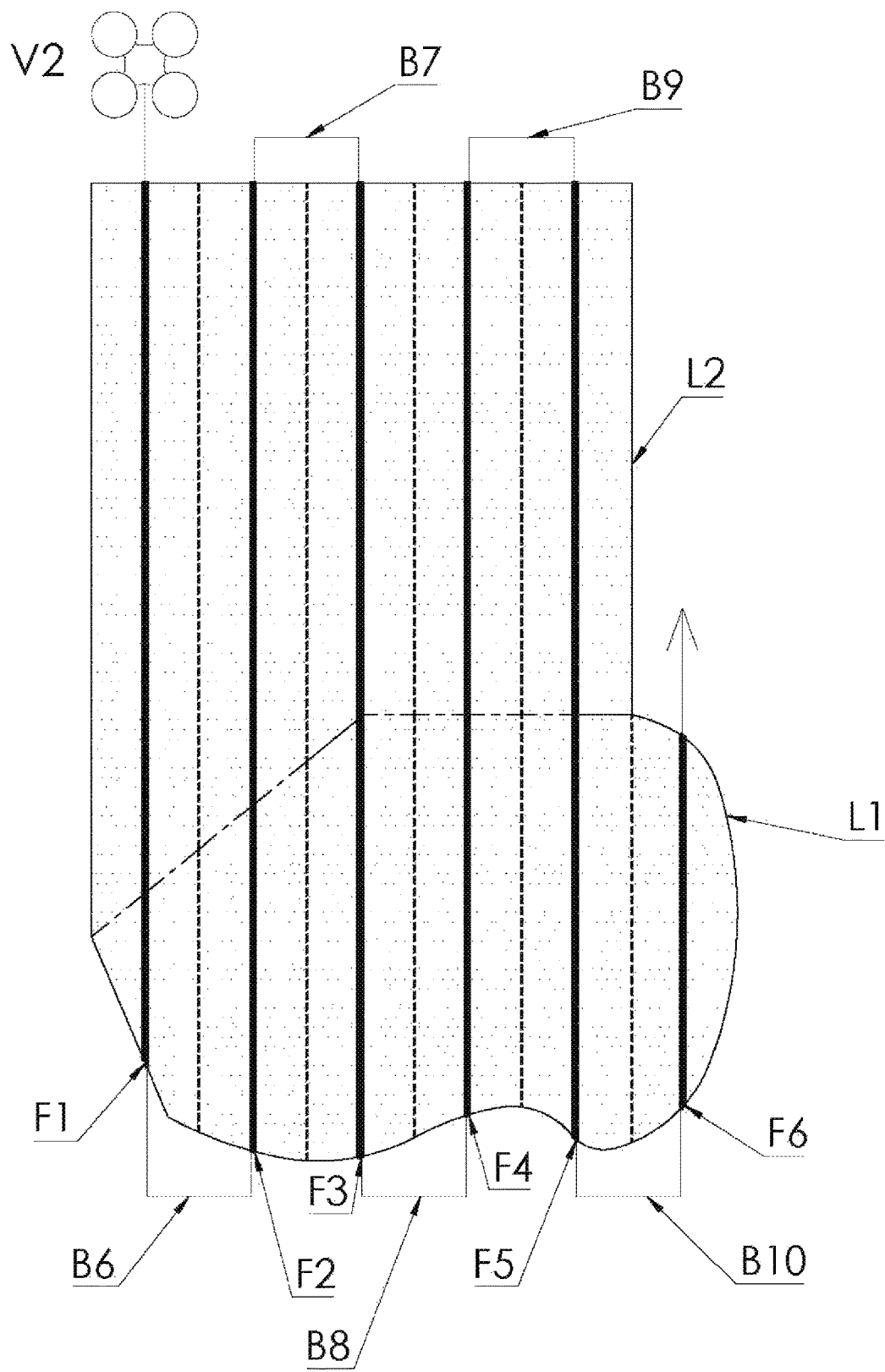
FIG. 4 is a representation of the system for defining application areas, using a V2 drone, for example, where biological inputs are released with the rate for each biological input and for each releaser individually or simultaneously.
Figure 6:
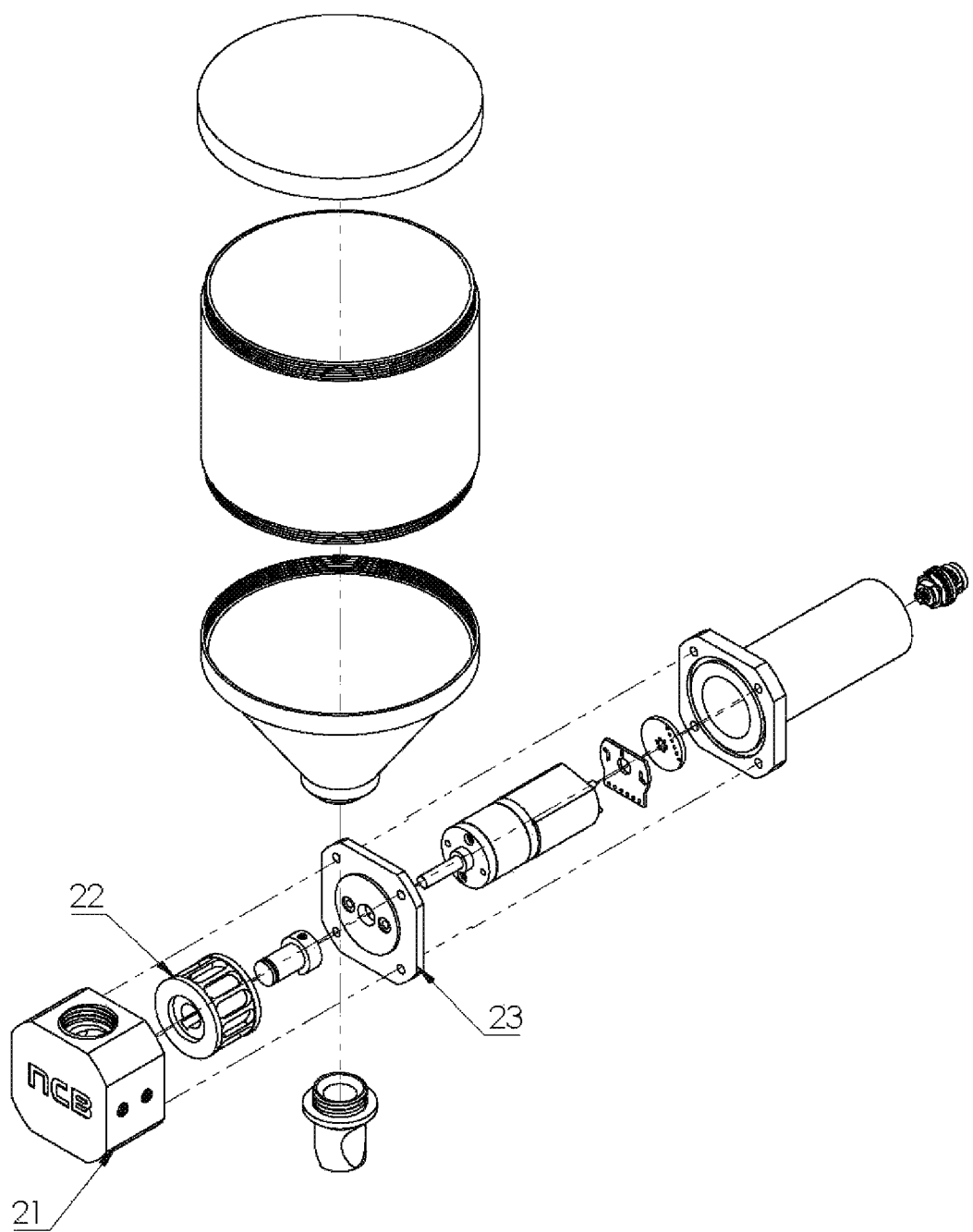
FIG. 6 is an exploded perspective view of the mechanical assembly for the release of parasitized loose eggs.
Figure 7:
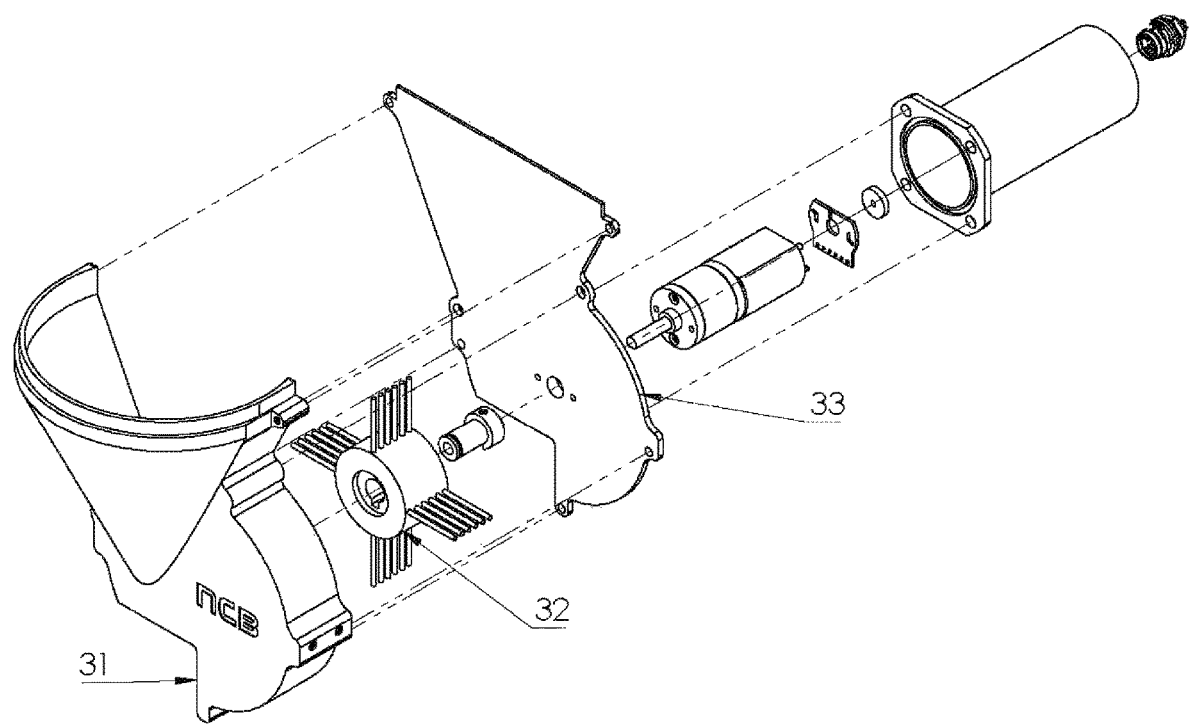
FIG. 7 is an exploded perspective view of the mechanical assembly for the release of loose masses.
Figure 8:
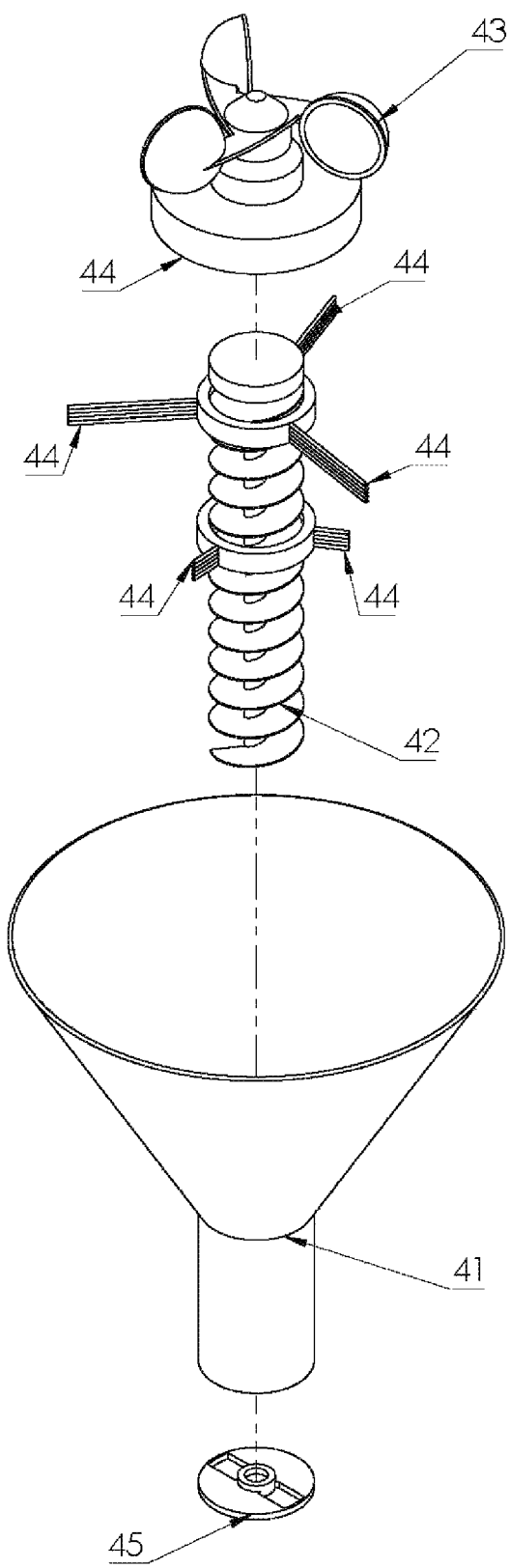
FIG. 8 is an exploded perspective view of the mechanical assembly for the release of live inputs (mites)
Figure 9:
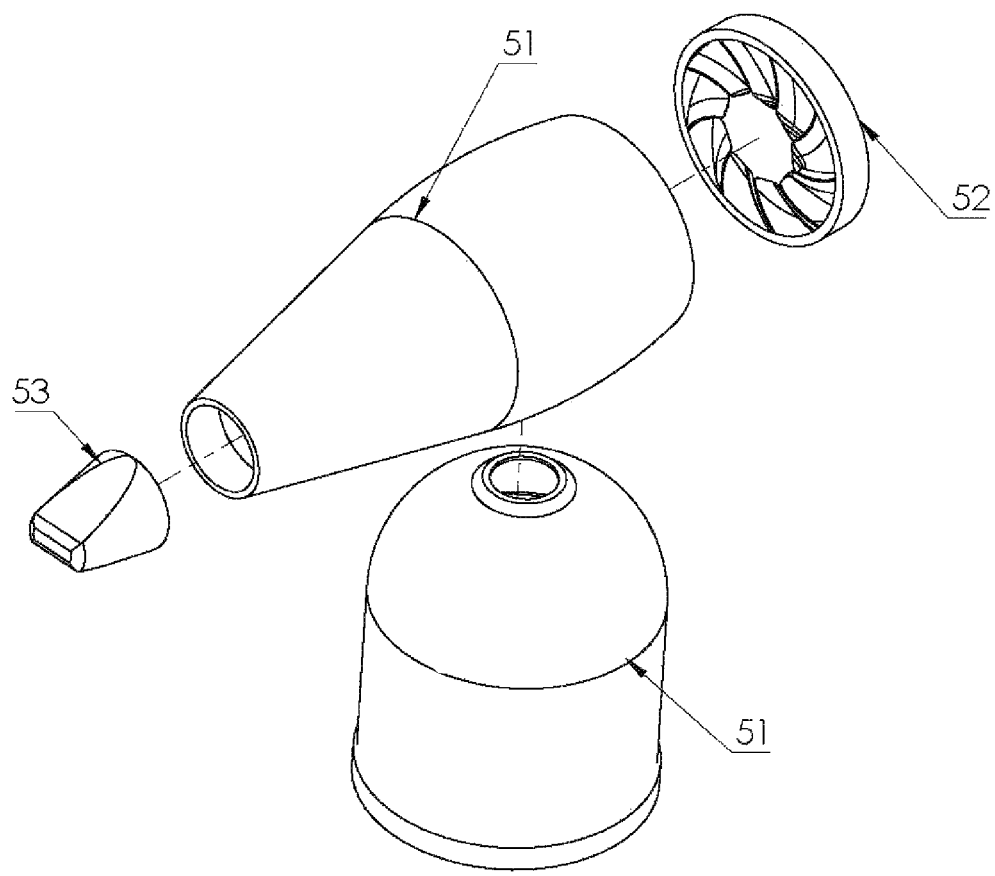
FIG. 9 is an exploded perspective view of the mechanical assembly for the release of beneficial powdered fungi.

In order to characterize the impacts and the scenarios in which the project is being developed, consider sugarcane as an example, which had approximately 9.3 million hectares harvested in 2017 (IBGE (Instituto Brasileiro de Geografia e Estatística [Brazilian Institute of Geography and Statistics])).

Currently in Brazil, there are no chemical options with a specific background in management of the sugarcane borer (*Diatraea saccharalis*). Bayer Cropscience's Certero and Arysta Lifescience's Diafuran 50 are examples; both have environmental classifications of hazardous and very dangerous, respectively (CRUZ). Certero, one of the main insecticides recommended for treatment, should be applied at the beginning of any infestation, when the caterpillars are small, and with up to 3% infestation intensity. Due to the phenological phase of the crop when the pest occurs, it can only be applied by airborne spraying, for example, using agricultural aviation. With an average total operating cost of BRL 35.00/ha for application of this chemical (four applications are required), without considering the cost of the chemical itself, and considering a utilization rate of agricultural aviation of 25%, according to SINDAG and PULVERIZADOR, for treatment, the cost of application of insecticides for the sugarcane crop alone has an estimated market value of approximately BRL 325.5 million (9.3 mha×25% AG×BRL 35/ha×four applications).

In light of this reality, and taking the same sugarcane borer as an example, biological management is basically performed by releasing loose eggs parasitized with *Trichogramma*. Approximately 300,000 ha are treated by BUG biological agents in blister packs for this crop alone (four releases are also required), at an average total cost of BRL 36.00/ha. Considering the same condition, covering this area alone, the service market for providing aerial release services is estimated at approximately BRL 10.8 million (0.3 mha×25%×BRL 36/ha×four releases).

In this context, this scenario illustrates the potential growth of aerial releases with regard to the accuracy of biological pest management and the need for increased efficiency through tools that enable access to larger areas.

It is a new and growing market, both in Brazil and worldwide.

The goal is the growing pressure for more sustainable procedures in order to compete in more demanding markets, since most chemical products have restricted classifications. The initial reduction in the use of these chemicals is estimated at 20%, and crop areas treated with this process will double in the first year.

The goal is to use drones with the multi-purpose embedded system and its BioBOT, BioCOTe, BioMITe and BioFUNgus dispensers for autonomous aerial releases, definitively replacing the manual procedure and in order to mitigate the issues involving operation of competitors' motorcycle, agricultural aircraft and mechanized systems. It is also expected that the use of drones will present operating costs that are compatible with the load paid, for which its use is intended.

Optimization and savings in several areas are the objectives. The comparisons and benefits when the system of this disclosure is used, based on the scenarios outlined above, are listed below.

Economic Comparison:

Cost of Workers×Cost of Equipment:

- Without the system of this disclosure: BRL 8.00 per hectare (on average, 20 workers are used to cover to 1 ha);
- With the system of this disclosure integrated: BRL 10.00 per hectare (on average, one worker is used to cover to 40 ha);

Production of the Current Area×Production of the Automated Area:

- Without the system of this disclosure: 300,000 hectares;
- With the system of this disclosure integrated: 600,00 [sic: 600,000] hectares (100% increase in the coverage of areas within the first year);

Use of Current Chemicals×Use of Chemicals with Expanded Biological Management:

- Without the system of this disclosure: BRL 325.5 million;
- With the system of this disclosure integrated: BRL 282.8 million (20% reduction in the use of chemicals within two years, with growth and access to larger scales of precision biological management).

Coverage Time:

Workers' Time×Automated Process Time:

- Without the system of this disclosure: six hectares per man-hour (on average, 20 workers are used to cover 1 ha);
- With the system of this disclosure integrated: 80 hectares per hour (considering a drone speed of 50 km/h and a range of 30 m).

Release:

Manual/Mechanized×Automated and Integrated:

- Without the system of this disclosure: manual or mechanized release without precision.
- With the system of this disclosure integrated: automated release, controlled by GPS and tracked;

Fixed Release Rate×Controlled Release Rate:

- Without the system of this disclosure: there is no accuracy of the release rate and the quantity released;
- With the system of this disclosure integrated: accurate control of the release rate in milliliters per hectare, based on GPS;

Manual/Mechanized Efficiency×Automated Efficiency:

- Without the system of this disclosure: low efficiency, with little control of the release rate and intra-species competition;
- With the system of this disclosure integrated: optimal release rate, automation and greater use of biological management.

Environmental:

Environmental Hazards×Sustainable Processes:

- Without the system of this disclosure: environmental contamination due to the classification risks of insecticides;
- With the system of this disclosure integrated: reduction of environmental hazards with the increase in the use of biological management.

Safety:
Manual/Mechanized Procedure×Automated Procedure:
  Without the system of this disclosure: stuck vehicles, motorcycle accidents and poor occupational safety record;
  With the system of this disclosure integrated: drone with digital mapping of the area, with occupational safety ensured.
Full Compliance:
Low Transparency×Traceability:
  Without the system of this disclosure: poor integration with uncertainties involving the coverage of the area and inaccurate release reports;
  With the system of the present disclosure integrated: alpha integration with software systems, digital mapping, automatic billing and the generation of accurate release reporting.

Technically, the system that comprises this disclosure is based on the technological evolution of high-performance embedded computers; specifically, complex cloud computing systems that can be based on artificial intelligence, smartphones and tablet PCs, which are robust and capable of assessing situations and parameters that manual release and existing mechanized products cannot.

The adoption of more efficient and interactive cloud-based computer systems and faster and more efficient and interactive smartphones and tablet computers has enabled the use of modern computer development methodologies, such as specific precision measurement frameworks, with GPS devices, the use of object-oriented programming languages, relational and non-relational databases and simplified, easy-to-assimilate machine-operator interfaces, such that digital integration and management have been considerably improved with regard to the state of the technique products.

The verification of distinct digital areas integrated with automated computing and management of the dispensers by the embedded system used in the disclosure, within the same physical rural property, allows for intelligent planning of the release process, defining different standards for each area and each dispenser individually, such that full operational planning is undertaken in order to improve the operation in its entirety, and not just partially. The definition of these areas also permits the exclusion of areas that are not interesting for the release, such that the system also makes its calculations based on these optimized route parameters, in order to achieve optimal coverage of the optimal route.

The purpose of the disclosure is to offer a simplified configuration system through a smartphone, tablet computer or PC application, using a cloud software system, in which the user must fill in the values, one at a time, thus avoiding configuration errors. Based on these values, the areas will be calculated automatically and the coverage and optimized routes will be presented to the user in the mission planner.

The aim is also to offer an apparatus that controls the release rate of biological material using a similar operating methodology for all dispensers, using an electromechanical system that controls the volume of the release flow, in milliliters per hectare.

The aim is also to offer operators information regarding the current situation in the area at the time of release, such as, for example, wind direction and speed, temperature and relative air humidity, and to inform and/or apply the best settings for the release parameters at that time.

Another objective of the disclosure is to offer an apparatus capable of using georeferenced map images in conjunction with geographical location devices (GPS) for visual measurement of relevant areas and elements, presented to operators during the release process, integrated with calculations for the optimal release rate.

A further aim is to offer an apparatus capable of recording and generating real-time data for the drafting of the reports on releases performed, making relevant calculations for measuring the process, such as the total area covered, total area sprayed, the route taken, total quantity of material consumed, time of operation, information on the status of the vehicle used (e.g., all available information on the drone), among other statistics useful for monitoring activities and of relevance to operators. These reports may be customized by the operators themselves in formats that are the most convenient and logical to monitor. These will be generated automatically in a cloud-based software system, together with billing for payment by clients. The inclusion of logos, client data, formatting and output file formats have been included so that it is no longer necessary to manually summarize the release information after receipt or to manually draft reports, thus avoiding potential fraud.

Accordingly, the aim is to provide an automatically-controlled apparatus using motors and actuators that, in an integrated manner with other components, particularly software and hardware, enables automation of the release process with a focus on precision biological management.

The aim is also to offer an apparatus that can gather relevant operational data and store them for subsequent consultation, either for the purposes of performance assessment or for generating indicators. The data gathered include, but are not limited to, height, speed, direction, vertical displacement, horizontal displacement, longitude and latitude positions, engine status, release rate, the operational aircraft or vehicle, material used, number of hours of operation, dates and times of events and the most recent operations undertaken with the apparatus.

Finally, the aim is to offer an apparatus that is easy to configure, use and modify (customize) parameters specific to the crop it is working with. New techniques have been included, as well as a change in the basic system parameters, such as colors, keywords, logos, system language, positioning, format and type of controls presented, and all the information presented to the pilot may be changed by a single user with system administrator powers, making use and comprehension of the system easier for users.

In the more complete version, for jobs that require maximum precision under critical conditions and greater autonomy, the apparatus will be supplied in its complete form, comprising a multi-purpose hardware system configured with two dispensers, which can be operated simultaneously or separately.

In a simplified version, for jobs that cover smaller areas, the apparatus will be supplied in a more cost-effective manner, comprising a multi-purpose hardware system configured with one dispenser, which may be connected to a customized touch screen interface, rather than a smartphone or tablet computer.

For other situations, versions of the apparatus that partially combine all of the aforementioned technologies and dispensers are planned.

The novelty aspect of this disclosure is related to the combination of release technology and its multi-purpose operation with different dispensers, operated with the assistance of vehicles with geographical location technology (e.g. drones) and with implementation in more modern computer systems that involve the application of recent material release techniques and agronomic planning.

In all versions, the vehicle chosen has the purpose of transporting the multi-purpose embedded system, the dispenser(s) and material through or over the target release site.

The purpose of the electromechanical dispenser assembly is to generate the desired volume of biological material and releasing it onto the target for dispersal by gravity. As it is equipped with flow control, it enables the release operation to be undertaken with constant correction adjustments, thus improving the efficiency and precision of dispersal of the biological material from each dispenser.

The computer program included in the system is the holder of the innovation in the form of planning, monitoring and execution of the application. It enables the definition of several different application areas, the planning of optimal routes over these areas, which ensure full coverage with the shortest route traveled, without sacrificing the safety of maneuvers, control based on data computed according to the desired concentration of material, also taking into consideration external factors, such as speed, height and ambient temperature. Fine tuning and adjustments to the system are performed automatically, following measurements of the position and geographic displacement (GPS) sensor and the sensors located in the dispensers, using management hardware equipped with processors and analysis and decision-making algorithms, based on parameters known to the material release technology. The durability of the apparatus allows it to operate for more working hours on a single day and under more adverse conditions, enabling it to operate on a larger number of days during the year.

The invention claimed is:

1. A multi-purpose embedded system for an autonomous release of biological agents in precision biological pest management that comprises:
   integration of a series of components applied to the precision biological management for installation in backpacks, on land vehicles, manned aircraft and unmanned air vehicles or drones; wherein the system comprises:
   a multi-purpose high-performance electronic apparatus;
   a GPS/GLONASS/GALILEO receiver, dedicated or shared with the drone;
   four different dedicated electromechanical dispensers, including a dispenser of loose parasitized eggs, a loose mass dispenser, a live material (mites) dispenser, and a beneficial fungi in powder form dispenser, each controlled individually or simultaneously by a high-performance multi-purpose electronic apparatus (hardware); configured and controlled via a dedicated touchscreen human-machine interface;
   a configured and controlled through a planning application in the form of a mobile device; or a configured in a desktop computer system through web software for management and planning wherein the presentation of the following functions: configuration of the drone's cruising speed (or associated vehicle); configuration of the width between coverage bands of the area; configuration of the release rate in milliliters per hectare; totalizer calculation (total volume applied); configuration of the release height based on a fixed value, topographic map or online topographic map; configuration of a withdrawal area; iterative adjustment of location and direction from the initial release point; iterative adjustment of curvatures for changes in bands; defining one or more customized polygons, reference points, route planning with illustrations and calculation of iterative areas on a map; optimized calculation of the instant rate in milliliters per minute based on all the previous characteristics for the automated operation of each dispenser individually or simultaneously; automated control of the instant rate in milliliters per minute, updated by the GPS/GLONASS/GALILEO receiver, including a differential signal, RTK or otherwise; system for individual dispenser calibration; sending data via serial interface, USB, Bluetooth and cloud via Wi-Fi network and mobile internet; generation of customized reports based on measurement metrics and quantity and pest type counts, performed manually or electronically, climate data, dispenser type, type of biological material with batch information, date of manufacture and expected date of birth, QR code related to biological material, client registration (with administrator and user name); generation of automatic billing based on client data, configurations, data received and customizable price tables; tracking and remote blocking of the apparatus; iterative data for navigation and operation of aircraft, with regard to displacement on a map; and generation of indicators based on artificial intelligence and machine learning algorithms in order to define intelligent pest-management strategies.

2. The multi-purpose embedded system for the autonomous release of biological agents in precision biological pest management of claim 1, further comprising a high-performance multi-purpose electronic apparatus (hardware) for configuration, control and management of the dispensers and generation of data inherent in the precision biological management used for: a high-performance CPU processing center, Bluetooth, Wi-Fi, UART (serial RS232) and USB communication interfaces, customized inputs and outputs for digital sensors and actuators, and an individual or simultaneous control unit for each dispenser dedicated to the automation of all biological material.

3. The multi-purpose embedded system for the autonomous release of biological agents in precision biological pest management of claim 2, further comprising an electronic system configured to support sensing and measurement of the flow and release rate of biological material, compatible with customized digital inputs and outputs of the multi-purpose, high-performance electronic apparatus.

4. The multi-purpose embedded system for the autonomous release of biological agents in precision biological pest management of claim 1, further comprising a dispenser configured for the release of biological material in the form of parasitized eggs that use: a casing for the main rotor; a rotating rotor controlled with compartments dedicated to the collection of the loose parasitized eggs from a specific compartment and mechanical relief system to maintain the integrity of the loose parasitized eggs, in accordance with the release rate in milliliters per hectare and all the configurations defined in the mission planning; and an integration support with apparatus body, its electromechanical components and connections.

5. The multi-purpose embedded system for the autonomous release of biological agents in precision biological pest management of claim 1 further comprising a dispenser for the release of biological material in the form of parasitized masses, which may include repellant, that uses: a casing for the main rotor; a rotating rotor controlled and based on nylon bristles dedicated to the collection of masses from a specific compartment and the separation of these masses while maintaining the integrity of the loose parasitized masses, in accordance with the release rate in milliliters per hectare and all the configurations defined in the mission planning; and an integration support with the apparatus body, its electromechanical components and connections.

6. The multi-purpose embedded system for the autonomous release of biological agents in precision biological pest management of claim 1, further comprising a dispenser for the release of live biological material, which may include inert material, that uses: a funnel-shaped compartment funnel for storing biological material; a continuous thread for moving and stirring the controlled storage compartment in accordance with the release rate in milliliters per hectare and all configurations defined in the mission planning; an electronic device based on electrical loads and on plastic bristles in order to electrostatically charge live biological material and the inert material, in order to increase the efficiency of the releases on the tops of high plants; and a centrifuge release nozzle for the distribution of biological material.

7. The multi-purpose embedded system for the autonomous release of biological agents in precision biological pest management of claim 1, further comprising a dispenser for the release of beneficial fungi in powder form that uses: an exhaust system housing and specific connection with the storage compartment; a rotary hood controlled according to the release rate in milliliters per hectare and all the configurations defined in the mission planning; and a release nozzle for homogeneous spraying without generating a powder vortex.

* * * * *